Dec. 31, 1946.    G. L. LARISON    2,413,572
VEHICLE EQUALIZING SUSPENSION
Original Filed Nov. 30, 1943    2 Sheets-Sheet 2
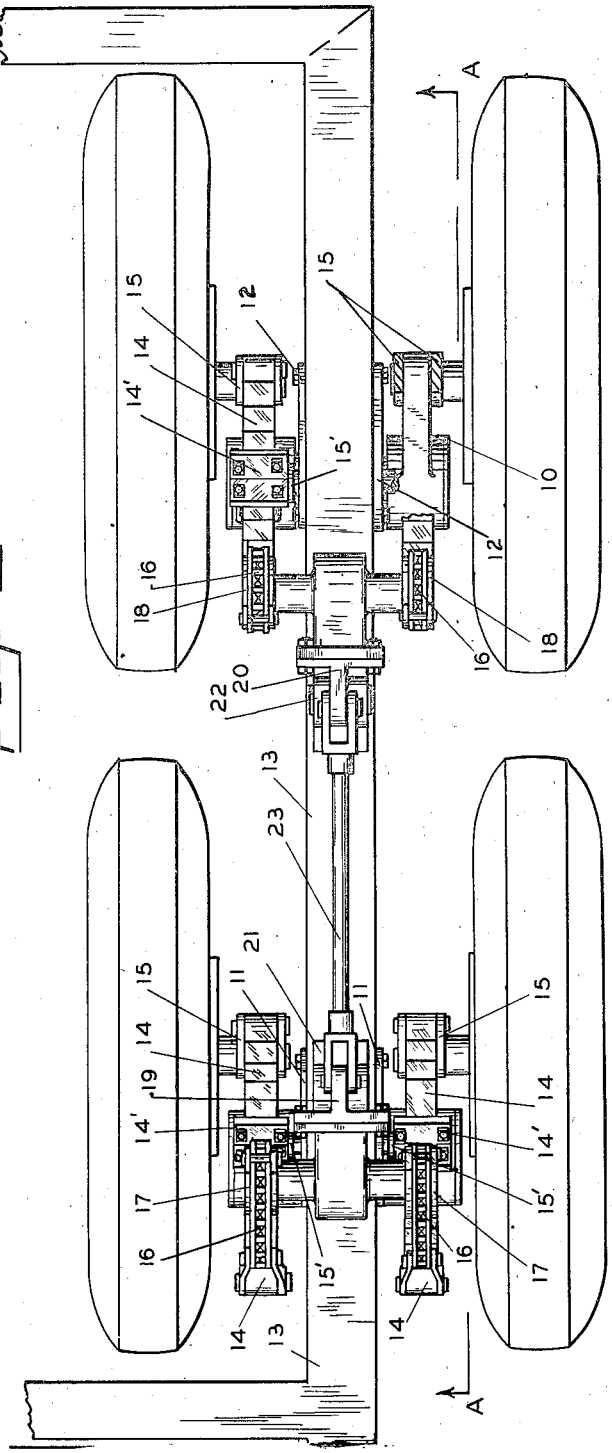
INVENTOR
GLENN L. LARISON
ATTORNEY Patented Dec. 31, 1946

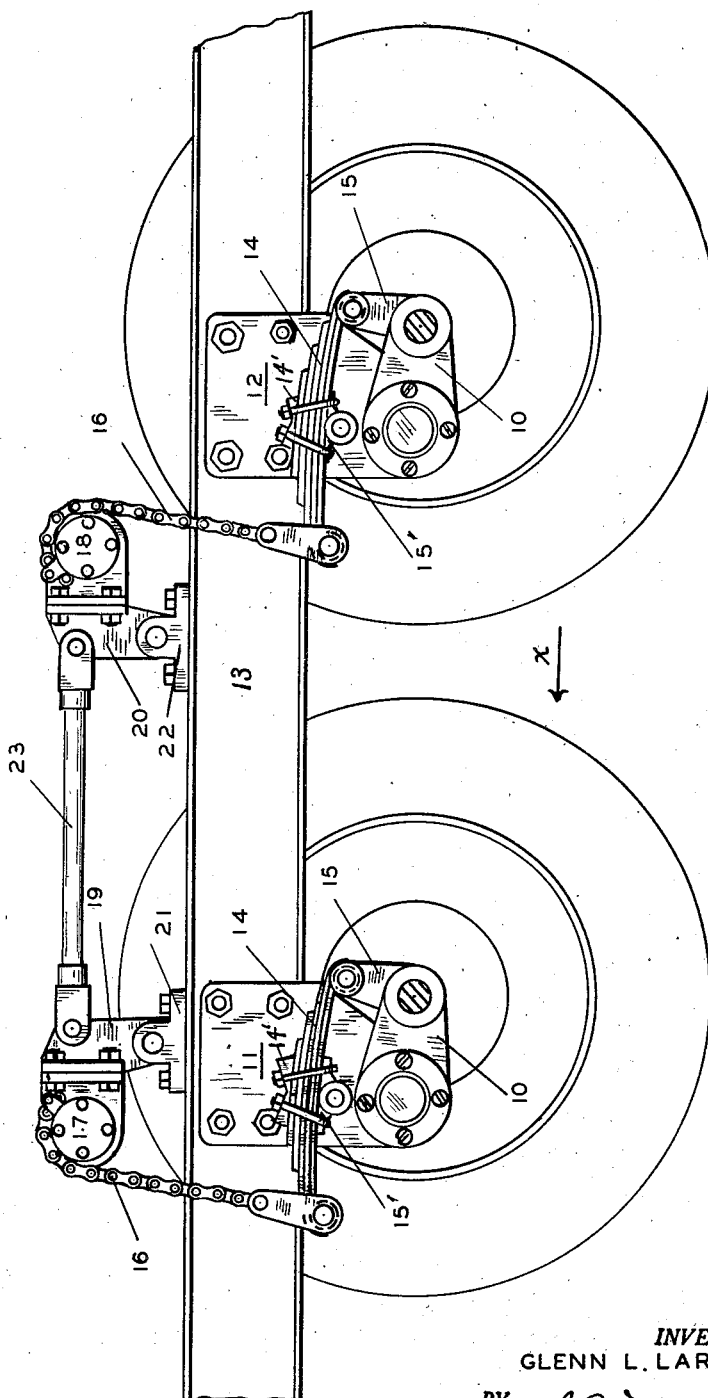

2,413,572

UNITED STATES PATENT OFFICE 2,413,572

VEHICLE EQUALIZING SUSPENSION

Glenn L. Larison, La Grande, Oreg., assignor to Larison Compensating Axle Corporation, La Grande, Oreg., a corporation of Oregon Original application November 30, 1943, Serial No. 512,353. Divided and this application February 12, 1945, Serial No. 577,566

3 Claims. (Cl. 280—104.5)

This application is divided from my pending application, Serial No. 512,353, filed under date of November 30, 1943, and entitled "Equalizing suspension for vehicles."

The invention specifically described in the present application has substantially the same objects in view as set forth in my application Serial No. 512,353, namely, the invention is intended to provide a vehicle suspension employing a minimum of two pairs of wheels at each side of the vehicle, the two pairs on each side being arranged substantially in tandem respectively, with each wheel carrying its proper share of the vehicle load under all normal conditions of travel.

Furthermore, the object of this invention is to provide an equalizing suspension involving the two pairs of wheel-carrying assemblies for the distribution of the portion of the vehicle load on that side of the vehicle among all four wheel-carrying assemblies, but without necessitating the usual "walking beam."

These objects I attain in the present invention by interconnecting the two wheel-carrying assemblies for each pair of wheels by a differential mechanism and by so mounting each of the two differential mechanisms that they can be moved as entire units, and finally by interconnecting the two mountings for the differential mechanisms by equalizing means.

In the accompanying drawings, which illustrate one way in which my invention can be carried out, Fig. 1 is a side elevation of two pairs of wheel-carrying assemblies, mounted in tandem arrangement on the same side of the vehicle, with the near-side wheels of both pairs removed for the sake of clarity, corresponding to line A—A of Fig. 2; and Fig. 2 is a fragmentary plan view of one side of the vehicle showing the two pairs of wheel-carrying assemblies located at that side of the vehicle, the top platform of the vehicle having been omitted from the drawings for the sake of clarity.

In the construction shown in the drawings, the forward and rear pairs of wheel-carrying assemblies 10 are hingedly mounted on brackets 11 and 12 respectively for movement in parallel vertical planes. The brackets 11 and 12 are rigidly secured to a side frame member 13 of the vehicle. A pair of leaf springs 14, carried in cradles 14', which cradles are rotatably mounted on shafts 15', are pivotally mounted on each bracket in the same vertical planes as the wheel-carrying assemblies respectively. One end of each leaf spring is connected to the spindle-carrying end of the corresponding wheel-carrying assembly by a link 15. This mounting of the wheel-carrying assemblies is similar to that described in my U. S. Letters Patent No. 2,226,100, issued under date of December 24, 1940, entitled "Vehicle wheel mounting," and in my U. S. Letters Patent No. 2,284,665, issued under date of June 2, 1942, entitled "Vehicle suspension."

The other ends of the leaf springs are connected by sprocket chains 16 to differential mechanisms. The pair of springs for the forward pair of wheel-carrying assemblies (the forward direction of travel of vehicle is indicated by the arrow x) are connected to the differential mechanism 17, while the springs for the rear pair of wheel assemblies are connected to the differential mechanism 18. The housings of the differential mechanisms 17 and 18 are rigidly secured to the pivoted arms 19 and 20 respectively, and these arms are pivotally mounted on brackets 21 and 22 respectively which are secured to the frame member 13. The arms 19 and 20 are also pivotally attached to opposite ends of the connecting link 23, so that they will swing in unison.

From the vehicle suspension shown in the drawings, it will be apparent that upward movement of either of the wheel-carrying assemblies of the forward pair will, when transmitted through the differential mechanism 17, cause a force to be exerted in the opposite direction on the other wheel-carrying assembly in the forward pair, but if both of these wheel-carrying assemblies are moved upwardly simultaneously, this upward movement of both assemblies, unless entirely cushioned by the leaf springs, will pull the arm 19 towards the left, as viewed in Fig. 1. However movement of the arm 19 to the left will produce similar movement in the arm 20, and such movement of the arm 20 will exert a force tending to move the rear pair of wheel-carrying assemblies downwardly. Similarly if the two rear wheel-carrying assemblies move upwardly simultaneously, the result will be to exert a force tending to move the two forward pair of wheel-carrying assemblies downwardly. Thus, this vehicle suspension acts in the same manner as a "walking beam" in equalizing the load between the front and rear pairs of wheels. Furthermore, due to the fact that the two wheel-carrying assemblies of each pair are interconnected by a differential mechanism, all four wheel-carrying assemblies will support their proper share of the vehicle load under all normal conditions of travel of the vehicle.

Although I have described a particular form of mounting for the wheel-carrying assemblies in each pair, other mountings could also be used for the assemblies and each pair of assemblies connected with a differential in the same general manner. Thus the wheel-carrying assemblies might be constructed in the form shown in my U. S. Letters Patent No. 2,349,289, dated May 23, 1944, entitled "Vehicle wheel mounting," the assemblies of each pair being connected to the opposite sides of a differential mechanism by suitable chains. It is essential however in carrying out my invention that the two differentials or compensating mechanisms be mounted for movement as entire units and be connected for simultaneous movement.

I claim:

1. In a vehicle equalizing suspension, a pair of wheel-carrying assemblies pivotally mounted on the same side of the vehicle for movement in substantially parallel vertical planes, compensating means located at said side of the vehicle, a pivoted member supporting said compensating means, said member mounted to swing in a substantially vertical plane, said assemblies connected to said compensating means and said assemblies and compensating means so arranged that movement of one of said assemblies will cause a force to be exerted in the opposite direction on the other assembly while movement of both assemblies in the same direction will cause said member with said compensating means to be moved, a second pair of wheel-carrying assemblies pivotally mounted in tandem with said first mentioned pair of assemblies, a second compensating means and a second pivoted member mounted to swing in a substantially vertical plane and supporting said second compensating means, said second pair of assemblies connected to said second compensating means, and equalizing means connecting said pivoted members.

2. In a vehicle equalizing suspension, a pair of wheel-carrying assemblies pivotally mounted on the same side of the vehicle for movement in substantially parallel vertical planes, a differential mechanism located at said side of the vehicle, a pivoted arm supporting said differential mechanism, said arm mounted to swing in a substantially vertical plane, said assemblies connected to said differential mechanism and said assemblies and differential mechanism so arranged that movement of one of said assemblies will cause a force to be exerted in the opposite direction on the other assembly while movement of both assemblies in the same direction will cause said arm with said differential mechanism to be moved, a second pair of wheel-carrying assemblies pivotally mounted in tandem with said first mentioned pair of assemblies, a second differential mechanism and a second pivoted arm mounted to swing in a substantially vertical plane and supporting said second differential mechanism, said second pair of assemblies connected to said second differential mechanism, and an equalizing link connecting said pivoted arms.

3. A vehicle equalizing suspension comprising a pair of wheel-carrying assemblies pivotally mounted on the same side of the vehicle for movement in substantially parallel vertical planes, a differential mechanism located at said side of the vehicle, a pivoted member supporting said differential mechanism, said member mounted to swing in a substantially vertical plane, said assemblies connected to said differential mechanism and said assemblies and differential mechanism so arranged that movement of one of said assemblies will cause a force to be exerted in the opposite direction on the other assembly while movement of both assemblies in the same direction will cause said member with said differential mechanism to be moved, a second pair of wheel-carrying assemblies pivotally mounted in tandem with said first mentioned pair of assemblies, a second differential mechanism and a second pivoted member mounted to swing in a substantially vertical plane and supporting said second differential mechanism, a second pair of assemblies connected to said second differential mechanism similarly, and an equalizing link connecting said pivoted members for movement in unison.

GLENN L. LARISON.